Jan. 9, 1968  J. L. VAUGHAN  3,362,696
BAFFLE ASSEMBLY

Filed April 8, 1963 2 Sheets-Sheet 1

INVENTOR.
JAMES L. VAUGHAN
BY *Pennie, Edmonds,
Morton, Taylor and Adams*
ATTORNEYS.

Jan. 9, 1968  J. L. VAUGHAN  3,362,696
BAFFLE ASSEMBLY
Filed April 8, 1963  2 Sheets-Sheet 2

INVENTOR.
JAMES L. VAUGHAN
BY Pennie, Edmonds,
Morton, Taylor and Adams
ATTORNEYS.

United States Patent Office 3,362,696
Patented Jan. 9, 1968

3,362,696
BAFFLE ASSEMBLY
James L. Vaughan, Summit, N.J., assignor to Separation Processes Corporation, Wilmington, Del., a corporation of Delaware
Filed Apr. 8, 1963, Ser. No. 271,220
14 Claims. (Cl. 261—114)

This invention relates to a method and apparatus for improving the efficiency of liquid-vapor contact by providing increased uniformity of liquid-vapor contact and by reducing random mixing of the liquid, and more particularly to a baffle assembly useful in apparatus for separating by liquid-vapor contact the components, or fractions, of a mixture of liquids.

Prior art

For mixtures of liquids, such as petroleum, it often is necessary to separate or fractionate the various components or fractions of the mixture. While this may be accomplished in various ways, most commonly today it is performed in a fractionating tower or column. Generally, a fractionating tower is a tall, narrow, closed, cylindrical structure through which vapor and liquid streams pass countercurrently in intimate liquid-vapor contact with one another. As used herein, the term vapor includes gasified liquid of the liquid mixture, gas injected into the column, if such is used, and any mist entrained in the rising gases, which mist should be minimized as it impairs the efficiency of the tower. In one form of fractionating tower, horizontal perforated trays or plates, spaced vertically in the column, insure intimate liquid-vapor contact. The input mixture of liquids, which often is preheated, is supplied to the tower at a selected one of the perforated trays making up the tower. This input mixture joins the descending liquid stream from the next higher tray and, as with the rest of the trays, the whole of the liquid reaching it flows across the tray as the vapor passes up through the perforations in the tray and through the liquid producing an agitated dispersion of vapor and liquid, or what may be termed a liquid-vapor foam. The level of liquid on the tray is controlled and maintained by a weir over which the outgoing liquid flows into a downcomer, or pipe, that feeds the liquid to the next lower tray.

The lighter, more volatile fractions of the liquid mixture will be gasified or vaporized by heat provided to the column, generally through the provision of a reboiler vaporizing the lower boiling fractions of the mixture reaching the bottom of the column, and rise through perforated trays in succession resulting in an increased concentration of lower boiling fractions in the product flowing as a vapor out the top of the column. After cooling and condensing these overhead vapor fractions, a portion of them are returned to the top tray of the column to effect countercurrent contact with the rising vapor. The heavier fractions increase in concentration in the liquid as it passes down the column and across each succeeding lower tray as liquid, the lighter fractions being vaporized during this passage. This separation of the liquid mixture into a larger proportion of lower boiling fractions in the upper portion of the column and higher boiling fractions in the lower portion of the column results in a temperature gradient throughout the column, the liquid on progressively lower trays being at progressively higher temperatures.

Briefly, fractionation of the liquid mixture occurs as follows. As the liquid mixture flows across a perforated tray, it will be contacted by the vapors rising through it from the trays beneath it, which have a larger proportion of the higher boiling fractions. The higher boiling fractions in the vapor will condense and result in the vaporization of lower boiling fractions in the liquid. The vapors thus enriched in the lower boiling fractions then pass to the tray above where the process is repeated. As the vapors rise through successive trays and contact the liquid flowing across each tray, the vapors become increasingly enriched in the lower boiling fractions. At the same time, the liquid flowing down the column becomes increasingly enriched in the higher boiling fractions. In this manner, the material fed to the column may be separated into fractions of lower boiling and higher boiling characteristics.

For best fractionation of the liquid mixture, it is necessary that all the liquid be distributed at a uniform level about the perforated tray while the liquid flows in a uniform manner across the perforated area, and that the vapor rising through both the tray and liquid be uniformly distributed about the tray and throughout the liquid. If the liquid is not distributed at a uniform level about the tray, a greater liquid pressure, or hydraulic resistance, will be encountered by the vapor rising through the tray at the area where the liquid level is greatest. The vapor flow then will naturally tend to be reduced in this area of increased resistance, and increased in the area where the resistance and liquid level is least. This results in the vapor channeling through the column without uniformly contacting the liquid, which reduces the fractionating efficiency of the tray. If the rate of liquid flow across the tray is not uniform, but rather some of the liquid shunts past the perforations around the edge of the tray for example, then liquid may bypass the liquid-vapor contacting operation of the tray, reducing the fractionating efficiency of the tray. Also, it is known that if the liquid can be made to flow across the tray in a manner such that there is a minimum of back-mixing of the liquid on the down-stream portions of the tray with the liquid on the upstream portions of the tray, the efficiency of the fractionation operation may be greatly improved, since by decreasing such back-mixing there will be a higher average concentration of the lower boiling fraction on the tray. If the vapor does not rise through the tray uniformly distributed about the tray and throughout the liquid, the liquid will not be uniformly contacted by the vapor and the best fractionation of the liquid mixture will not be obtained. In short, for best fractionation efficiency, it is essential that the liquid move across the perforated tray with a minimum of back-mixing and at a uniform rate and level, and that the vapor rise through the perforated tray and pass through the liquid at a uniform rate and distribution. The hydraulic gradient, or difference between the levels of the incoming and outgoing liquid on the tray, is a convenient test for this uniform liquid-vapor distribution, for if the levels are the same, or the hydraulic gradient is zero, then a uniform liquid-vapor distribution is present under the usual operating conditions.

Various structures have been devised to minimize these dangers and maximize fractionation efficiency. For example, various types of perforated tray bubble cap structures have been devised to contral the flow of vapor through the tray perforations and liquid on the tray. Some of these tray structures also give the vapors a downstream component, to push at least the liquid adjacent the tray downstream. This is of limited effectiveness in improving the uniformity of liquid-vapor distribution and does not decrease the back-mixing. Also, baffles have been submerged in the liquid to control and direct liquid flow across the perforated tray. These baffles have permitted back-mixing of the liquid, and increased the hydraulic gradient, thereby impairing the fractionating efficiency of the tray. Some baffles require imperforate sections on the tray to permit the liquid-vapor foam flowing across the tray to coalesce.

Besides increasing the hydraulic gradient, this effectively removes a substantial portion of the perforated area of the tray from the liquid-vapor contacting operation, thereby further reducing the fractionating efficiency of the tray. In short, no bubble cap or baffle structure has yet been devised which has proven entirely satisfactory in maximizing the efficiency of fractionation of the liquid mixture.

The invention

The present invention relates to a baffle assembly useful in a fractionating tower. The baffle assembly has at least two wall elements, a lower wall element which may be attached in a fluid-tight manner on the perforated area of a perforated tray, and an upper wall element, the lower edge of which forms with the upper edge of the lower wall element a substantially horizontal orifice which, during normal operation of the tower, is submerged in the liquid on the tray. The lower wall element extends under the horizontal orifice and prevents vapors issuing from the perforations in the tray from passing upwardly through the horizontal orifice. Preferably, the upper wall element is slanted in a downstream direction to control and direct, with the horizontal orifice, the flow of both vapor and liquid. Also the baffle assembly preferably is used with a notched outlet weir at the downstream end of the perforated tray which controls the liquid level and back pressure on the tray.

In this specification, when an element is referred to as slanting upstream or tilted in an upstream direction, it means that the upper edge of the element is horizontally displaced from the vertical plane defined by the lower edge of element in a upstream direction, i.e. a direction opposite to the direction of flow of liquid across the tray. Similarly, a downstream slant or tilt means that the upper edge of the element is horizontally displaced from the vertical plane defined by the lower edge of the element in a downstream direction.

The baffle assembly will be further described in connection with the accompanying drawings, in which.

Figure 1:
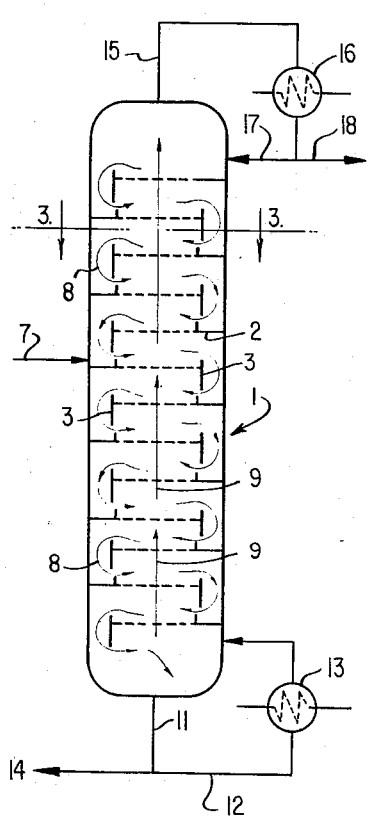
FIG. 1 is a diagrammatical view of a fractionating tower and its associated apparatus.

A typical fractionating tower arrangement minus the baffles of the present invention is shown in FIG. 1. The vertical, cylindrical, fractionating tower 1 has a plurality of horizontal, generally disc shaped, perforated trays 2 supported therein in a conventional manner and across which liquid may flow. A vertical plate 3 is attached to a chordal edge of each tray, the plates on adjacent trays being on opposite sides of the tower. A top portion of plate extends a few inches above tray 2, and forms an outlet weir 4, which dams liquid flow across the tray. The major bottom portion of each plate extends towards the next lower tray 2, and with the adjacent side of the tower forms a downcomer 5 for disengaging vapor from the liquid-vapor foam and supplying liquid flowing over weir 4 to the next lower tray. The lower edge of plate 3 lies approximately in the plane of the top edge of outlet weir 4 of the next lower tray, and during operation of the tower lies within the liquid on the next lower tray to prevent vapor from channeling up the downcomer. Each tray has a plurality of small, regularly spaced openings or perforations 6 between the downcomer and outlet weir through which the vapor rising in the tower may pass to contact the liquid flowing across the tray.

The input mixture of liquids 7 is supplied to the tower at a selected one of the perforated trays. This input mixture joins the descending liquid stream 8 from the next higher tray and the whole of the liquid flows across the tray, cascading in a zigzag fashion down the tower and across each tray. As the vapor 9 passes upwardly through the tower, it passes through the perforations in each tray and through the liquid flowing across each tray, producing on each tray an agitated dispersion of vapor in the liquid, or what may be termed a liquid-vapor foam. As the warmer vapor passes upwardly through the cooler liquid, the vapor approaches an equilibrium with the liquid and, as described before, the less volatile components of the vapor will condense in the liquid, thereby causing the more volatile components of the liquid to vaporize and rise through the liquid, separating the input mixture of liquid into predominantly lower boiling fractions at the top of the tower and higher boiling fractions at the bottom of the tower.

The less volatile, or higher boiling fractions 11 of the liquid mixture are withdrawn from the bottom of the column. One portion 12 of these fractions is heated by a reboiler 13 and returned to the bottom section of the column. The other portion of these heavier fractions 11 are withdrawn as the heavier boiling fractions product 14. The lighter, more volatile components, or lower boiling fractions 15, are withdrawn as vapor from the top of the column and supplied to a condensor 16. After these overhead vapor fractions are cooled and condensed by the condenser, one portion 17 of them is returned to the top tray of the column to cascade as liquid in a zigzag fashion down the column and across each perforated tray. The other portion 18 of them is withdrawn as the lighter boiling fractions product. The structure and operation so far described is well known to those skilled in the art.

An inlet weir 19 is attached to each perforated tray 2 beneath and slightly downstream of the downcomer 5, and preferably at the upstream margin of the perforated area of the tray. The inlet weir inhibits the free flow of liquid from the downcomer across the perforated area of the tray by damming the flow of incoming liquid from the downcomer at a level adjacent to the tray to form a pool of liquid between the inlet weir and the side of the tower. This pool of liquid inhibits channeling of vapor through the downcomer at low liquid flow rates. At high liquid flow rates, the inlet weir 19 also causes the incoming high velocity liquid to flow onto the perforated area of the tray at a level substantially above the perforated tray and with a substantially increased horizontal velocity component thereby decreasing the tendency of this high velocity liquid stream to reduce the vapor flow through the initial rows of perforations in the tray and to flow through these perforations, bypassing the contacting operation. Thus, the inlet weir also effectively decreases weeping of the liquid through the adjacent first few rows of perforations in the perforated tray at high liquid rates.

Figure 2:
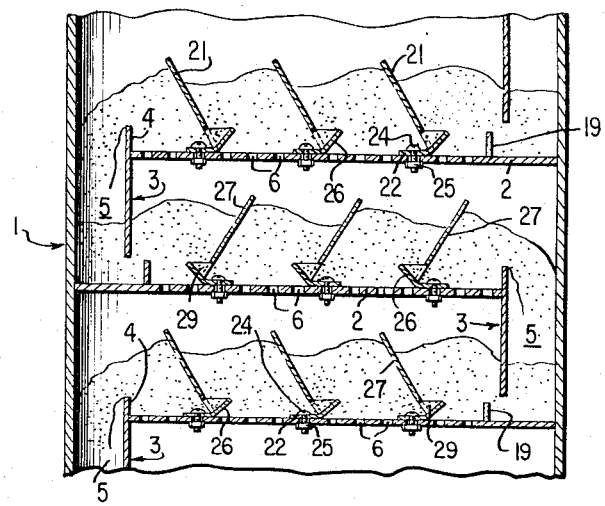
FIG. 2 is a longitudinal section view of a portion of the fractionating tower with the outer wall removed and in operation, with baffle assemblies mounted on the perforated trays.
Figure 3:
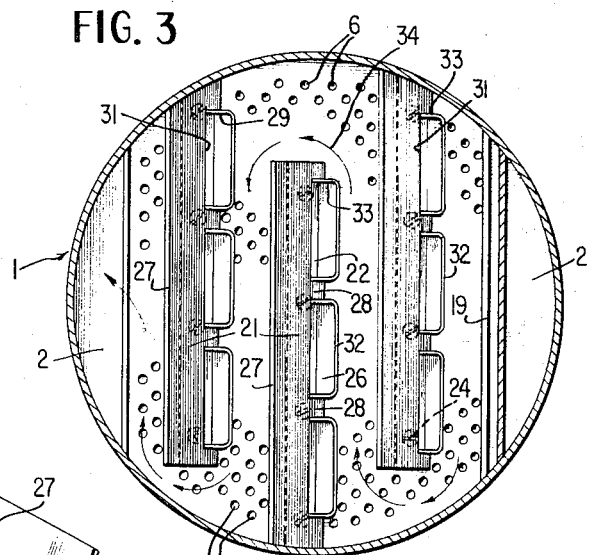
FIG. 3 is a transverse sectional view taken on lines 3—3 of FIG. 1 showing the baffle assemblies mounted on a perforated tray.
Figure 4:
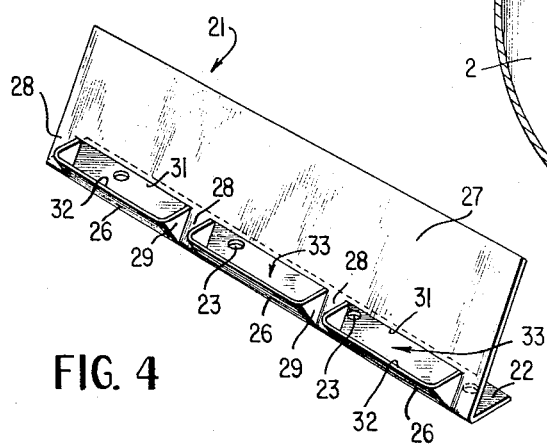
FIG. 4 is an enlarged perspective view of one of the baffle assemblies illustrated in FIG. 2.

Preferably a plurality of baffle assemblies 21 are mounted within the perforated area of each perforated plate 2 spaced downstream one from the other, as shown in FIG. 3, the baffle assembly furthest upstream being spaced downstream from the inlet weir. For normal flow rates, the baffle assemblies may be spaced about 6 inches to 4 feet apart, depending upon the liquid flow rates. As shown in FIGS. 2–4, each baffle assembly includes a lower flange 22 having openings 23. Bolts 24 pass through openings 23 and through perforations in the perforated tray 2, and a nut 25 is threaded tightly on to the free end of the bolt beneath the perforated tray, the nuts and bolts clamping the baffle assemblies to the perforated tray in a fluid-tight manner. While it is preferred to use bolts to attach each baffle assembly to the perforated tray, the baffle assemblies may be attached in a fluid-tight manner to the perforated tray in various other ways, such as by welding flange 22 to the perforated tray. Each baffle assembly includes a lower wall 26 and an upper wall 27. The lower wall 26 extends upwardly into the lower level of liquid flow across the tray from one end of flange 22, and preferably is tilted in an upstream direction. The upper wall 27 preferably is attached to the lower wall and flange 22 by legs 28 extending from the lower edge of the upper wall to the flange, and webs 29 are provided between the sides of legs 28 and the adjacent sides of walls 26 to prevent fluid flow therethrough. The upper wall lies in an upper level of liquid flow across the tray, and preferably is tilted in a downstream direction. The lower edge 31 of the upper wall is spaced downstream from the upper edge 32 of lower wall 26, the edges preferably lying substantially in a horizontal plane and providing a horizontal orifice 33 therebetween. The horizontal orifice should not be higher than the top of the outlet weir, for free flow of foam therethrough, and may be somewhat lower than the top of the outlet weir. Each baffle assembly may be pressed or otherwise formed a single sheet of metal, the legs 28 of the upper wall thus lying between the adjacent edges of the lower wall sections 26.

Preferably, the baffle assemblies are of standard lengths, or of the same length, alternate ends of the baffle assemblies abutting against opposite sides of the fractionating tower as illustrated in FIG. 3. This arrangement prevents liquid from flowing past the ends of the baffle assemblies and shunting around the perforations and along the imperforate margin of the tray to the outlet weir 4. Rather, all incoming liquid must flow past at least one baffle assembly and across the perforated portion of the tray, the baffle assembly thereby controlling the velocity and movement of the liquid across the perforated tray. At low liquid and vapor flow rates, such as are encountered during start-up of the fractionating tower, while the vapor flow rates might not be sufficient to cause the foam to flow over the upper edge of lower wall 26 of the baffle assembly to establish a uniform liquid level on the tray without weeping, still the liquid may flow in a zigzag fashion around the end of each baffle assembly which is spaced from the side of the fractionating tower, and past each baffle assembly across the portion of the perforated tray between the baffle assemblies to the outlet weir 4, as indicated by arrows 34. Thus, by this arrangement of the baffle assemblies, uniform conditions of liquid-vapor contact may be established even at low vapor flow rates.

*Operation*

As the vapor bubbles through the liquid on the perforated tray, the rising bubbles in the liquid push ahead of them a substantial amount of liquid, the liquid adjacent the bubbles flowing around the side of the bubble and back over the bubble, producing in the path of the bubble a generally upward flowing stream of liquid. As the rate of vapor flow rises, more and more bubbles pass through the liquid producing a greater upward flow of the liquid, as indicated by the increasing height of the foam surface above the tray with increasing vapor flow rates. For any segment of the foam, the vapor bubbles passing through the segment produce an upward force counterbalanced and offset by the downward gravitational force of the liquid.

The lower wall 26, extends under and completely across the vertical zone defined by the horizontal orifice 33. Thus, the vapor bubbles issuing from the perforations in the vertical zone beneath the horizontal orifice and lower wall 26 are deflected in an upstream direction by the lower wall, sweeping with them the liquid beneath the lower wall and producing a strong upward flow of bubbles and liquid adjacent the upper edge 32 of the wall. Since the vapor issuing from the perforated tray is deflected away from the zone vertically above the horizontal orifice by walls 26 and 27, the upward current of liquid and vapor in this zone is appreciably reduced with respect to the upward flow of liquid adjacent and upstream of this zone. The liquid in a segment of liquid-vapor foam above the perforated tray which flows downstream into this zone will have a given amount of potential energy with respect to the tray, depending on its height above the tray. Since the velocity of upward flow of liquid and vapor vertically above the horizontal orifice 33 is appreciably reduced, the liquid flowing into this zone will tend to fall. The potential energy of the liquid flowing into the zone is converted to kinetic energy as the liquid drops through this zone and through horizontal orifice 33. The upper surface of lower wall 26 directs this downwardly flowing mass of liquid carrying entrained vapor with it downstream in a generally horizontal direction, turning the downward force of kinetic energy outwardly and horizontally in a downstream direction.

Lower wall 26, by being attached in a fluid-tight manner to the perforated tray, prevents leakage of fluid from one side of the baffle to the other side of the baffle. Because the lower wall and perforated tray in this manner effectively isolate the fluid pressures upstream and downstream of the baffle assembly from one another, it is possible to have a different liquid and vapor pressure downstream of the baffle assembly than upstream of the baffle assembly adjacent lower wall 26. And because of the appreciable kinetic energy of the liquid and vapor flowing through the horizontal orifice, the pressure downstream of the baffle assembly actually may be greater than the pressure upstream of the baffle assembly. Thus, by using only the horizontal orifice formed by the two walls, and by attaching the lower wall to the perforated tray in a fluid-tight manner, it is possible to have an equal, lesser, or even greater pressure and height of liquid and vapor downstream of the baffle assembly than upstream of the baffle assembly. By varying the size of the horizontal orifice, the resistance to the flow of liquid and vapor through the horizontal orifice may be varied.

Because of these two factors—the horizontal orifice and the isolation of pressures—it is possible by selecting the appropriate size orifice to present just enough resistance to the flow of liquid through the horizontal orifice to make the downstream pressure equal to the upstream pressure. Accordingly, the downstream liquid and vapor level will be exactly equal to the upstream liquid and vapor level, and the desired zero hydraulic gradient across the plate as a whole results.

The resistance to flow of liquid and vapor through any given size of horizontal orifice also effectively may be varied by varying the plane of the orifice from the horizontal. In other words, by making the lower edge 31 of upper wall 27 higher than the upper edge 32 of lower wall 26, effectively opening the orifice, some leakage of the increased downstream pressure back through the horizontal orifice to the upstream side of the baffle assembly is permitted, reducing the downstream pressure. By forming the baffle assembly with lower edge 31 of upper wall 27 lower than the upper edge 32 of lower wall 26, effectively closing the orifice, flow of liquid and vapor through the orifice will be further restricted by the slight channel between the two walls, and this added restriction will decrease the kinetic energy of the liquid and vapor flowing through the orifice, reducing the downstream pressure. Preferably though, flow through the orifice is not restricted for this just absorbs energy, and the adjacent edges of the walls lie either in a horizontal plane, or the lower edge of upper wall 27 is slightly higher than the upper edge of lower wall 26.

If only lower wall 26 of the baffle assembly were provided, it would serve as an obstruction to the flow of foam across the perforated tray, thereby resulting in excessive resistance to flow and a high hydraulic gradient which would yield a poor vapor-liquid distribution about the tray. If only upper wall 27 were provided, again an obstruction to the flow of liquid across the tray would be provided, resulting in high resistance to the flow of liquid across the tray. Because of the obstruction encountered if either lower wall 26, or upper wall 27 were provided, an appreciable hydraulic gradient would result. In short, if either wall 26 or wall 27 were used alone, fractionating efficiency of the tray would be reduced. If walls 26 and 27 were combined to provide a baffle assembly such as that just disclosed, but foam was permitted to flow back under or through the baffle assembly, such as would occur if the lower wall of the baffle assembly were spaced from the perforated tray, or openings were provided through the lower wall, then the pressure differential advantage available from the baffle assembly would be negated. This arrangement too, then, would only restrict the flow of liquid across the perforated tray and impair the fractionating efficiency of the tray. For a pressure differential advantage to be provided by the baffle assembly, it is necessary for the lower wall of the baffle assembly and the adjacent supporting flange to be connected to the perforated tray in a fluid-tight manner, thereby maintaining the pressure differential across the baffle assembly adjacent the perforated tray.

For normal flow rates, the area of this generally horizontal orifice 33 may be about one-quarter or less of the cross-sectional area of the liquid-vapor foam adjacent the baffle assembly at generally used liquid and vapor rates. That is, for an orifice which extends completely across the liquid and vapor stream, if the upper surface of the foam were 6 inches above the surface of the perforated tray, then the width of the orifice would be about 1½ inches. This relationship will provide, or closely approximate, a zero hydraulic gradient at generally used liquid and vapor rates.

Placing a horizontal orifice in the liquid may be compared to placing a disc in the path of fluid flow through a pipe, the disc having a small opening therethrough. As is well known, for fluid flow through this pipe, the opening through the disc would cause a substantial pressure drop as the fluid flowed past the orifice. As the fluid flow increased, this pressure difference also would increase. Such would appear to be the case if a baffle having a horizontal orifice were placed in the path of liquid-vapor flow across a perforated tray. The downstream pressure would seem to be substantially less than the upstream pressure, and a substantial hydraulic gradient necessarily would seem to result. However, such is not the case. By providing an appropriate baffle, such as that just described, not only is the downstream pressure not substantially less than the upstream pressure, but rather it may be made equal to, or even greater than, the upstream pressure by appropriate correlation of variables, such as liquid and vapor flow rates and orifice size.

As the liquid and vapor stream issues from the orifice and moves downstream of lower wall 26, the vapor bubbles rising from the perforations immediately downstream of flange 22 provide a lifting effect, carrying the liquid up. As these vapor bubbles engage the lower downstream surface of upper wall 27, they are deflected in a downstream direction by this surface. As the bubbles rise along this surface, they push liquid and vapor in front of them, and impart a positive, forward, downstream force to the liquid and vapor. By varying the downstream inclination of upper wall 27, the downstream force imparted in the liquid and vapor by upper wall 27 may be varied. Preferably, the downstream inclination of upper wall 27 is approximately 30° to the vertical. For angles substantially less than this, the downstream force imparted to the liquid and vapor is decreased to a significant extent and the quality of liquid which may be processed under given conditions of vapor flow and liquid level is reduced. For angles substantially greater than 30°, the amount of vapor rising along the lower surface of upper wall 27 will increase until the liquid and vapor rising along the wall shoots and spits into the vapor area above the surface of the foam. This tends to increase the entrainment of liquid mist in the vapor rising to the next perforated tray, which decreases fractionating efficiency. Accordingly, a downstream inclination of upper wall 27 of approximately 30° is preferred, as it provides a desirable balance between the downstream force imparted by the inclined upper wall to the liquid and vapor downstream of the wall, and the entrainment of mist in the vapor above the surface of the foam.

*Specific examples*

A baffle system, similar to that shown on a perforated tray in FIG. 2, was constructed and tested. The tray was perforated with ¼ inch openings spaced on ¾ inch equilateral triangles, a perforation density of about 280 openings per square foot. The perforated area of the tray was about six feet long and one foot wide. Inlet and outlet imperforate calming areas also were provided, each of about two feet in length. At the end of the calming area, an outlet weir was provided which was about 3 inches high. Four baffle assemblies were mounted along the perforated area of the tray, at distances of 2, 3 4 and 5 feet from the upstream margin between the inlet calming area and the perforate area, and each extended transversely completely across the perforated tray. The lower baffle wall of each baffle assembly was about 2⅜ inches wide, and tilted upstream at an angle of about 35° to the vertical. The upper baffle wall was about 6 inches wide, and tilted downstream at an angle of about 30° to the vertical. The lower edge of the lower baffle wall was positioned about ¾ of an inch in front of the vertical plane defined by the lower edge of the upper baffle wall, and a horizontal flange about ¾ of an inch wide extended from the lower edge of the lower baffle wall under the remaining portion of the vertical zone defined by the horizontal orifice, completely blocking gas flow from the perforated tray upwardly through the horizontal orifice. The baffle walls were mounted on the perforated tray to form a substantially horizontal orifice between their adjacent edges of about 2 inches in width, the orifice being about 2 inches above the tray. The top of the upper baffle wall was about 7¼ inches above the tray.

The baffle system was tested using water as the liquid and air as the vapor. At a liquid flow rate of 52 gallons per minute, and a vapor flow rate of 1620 cubic feet per minute, the height of the water-air foam was about 8 inches above the tray. Since the foam flowing into the vertical zone defined by the two baffle walls drops as it flows across and down through the zone to the horizontal orifice, and since the foam is ejected in a downstream direction adjacent the upper edge of the inclined upper baffle wall, while the average foam height was greater than the height of the baffle assemblies, little or no foam spilled over the top edge of the upper baffle wall. The height of the foam, and the height of the liquid on the calming areas, was essentially even across the perforated area of the tray, showing that a zero hydraulic gradient had been obtained. For a given weir height, at substantially higher flow rates, the downstream foam level tended to be higher than the upstream foam level, while at substantially lower rates the upstream foam level tended to be higher than the downstream foam level. Streams of dye were introduced in the liquid at the inlet side of the tray, and visually illustrated the uniform liquid flow forward through the orifice and across the perforated tray, with little back-mixing even though the height of the foam was above the top of the baffle assembly.

For the baffle assembly just described, a substantial variation in flow rates will produce a substantial hydraulic gradient. In other words, a zero hydraulic gradient will be obtained with the baffle assembly just described only over a relatively narrow range of flow rates. In many fractionating towers, the flow rates may vary over a relatively wide range. Thus, it is preferable to provide an assembly which would effect a zero hydraulic gradient over a wide range of flow rates.

Figures 5, 11:
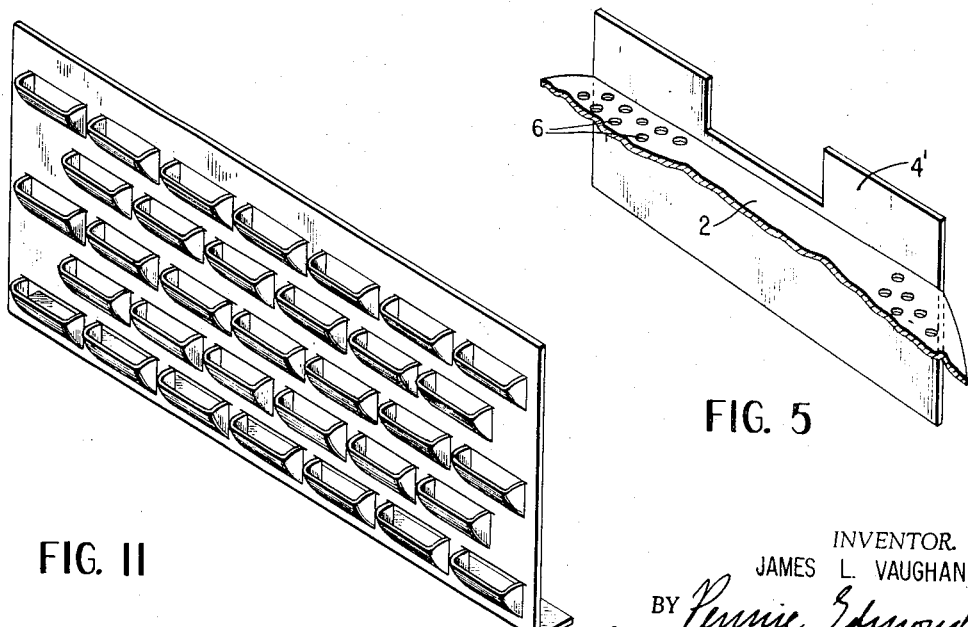
FIG. 5 is a perspective view of a notched weir and a section of the adjacent perforated tray.
FIG. 11 is an enlarged perspective view of another modified baffle assembly.

A zero hydraulic gradient may be obtained over such a wide range of flow rates by utilizing, in combination with the baffle assemblies, a notched outlet weir 4', such as is shown in FIG. 5. The notched outlet weir will regulate the downstream foam pressure of the baffle assembly and thereby counterbalance, for varying flow rates, the correspondingly varying kinetic energy of the foam flowing through the horizontal orifice and downstream of each baffle assembly. Thus, by providing an appropriately designed notched outlet weir, the increased kinetic energy of the foam issuing from the baffle assembly as the liquid flow rate and height of the foam increases may be exactly offset by the increased back pressure provided by the notched outlet weir to result in a zero hydraulic gradient over a wide range of flow rates. While a rectangularly shaped notch has been illustrated, other shapes of notches may be provided in the outlet weir, depending upon the back-pressure characteristics desired.

A baffle system simialr to that described in the previous example was utilized to demonstrate the effect of a notched outlet weir. The upper wall of each of these baffle assemblies was angled approxidately 20° downstream, rather than 30 degrees as in the previous example, giving a total baffle assembly height of approximately 7½ inches. The perforated area of the tray was about 10½ inches wide, rather than one foot wide. The notched outlet weir was placed at the downstream end of the perforated area of the tray. The notched outlet weir was about 10 inches in overall height, and a notch of about 4½" wide and 7$\frac{13}{16}$ inches deep was provided in the top edge of the outlet weir centered between the sides of the weir. The base of the notch was about 2$\frac{3}{16}$ inches above the perforated tray. Other than for these differences, the assembly was the same as that described in the previous example.

This assembly was tested using water as the liquid and air as the vapor. The vapor flow rate was maintained at 1,458 cubic feet per minute. After startup, for liquid flow rates of between substantially zero and 52 gallons per minute, a hydraulic gradient of less than ⅛ of an inch was obtained. This is substantially a zero hydraulic gradient. For a liquid flow rate of 30 gallons per minute, the foam height was approximately 7 inches above the perforated tray. For a liquid flow rate of 52 gallons per minute, the foam height was approximately 8½ inches above the tray. Again, because the foam drops between the baffle walls and into the horizontal orifice, and because the foam is ejected from the upper baffle wall in a downstream direction, little foam spilled over the top edge of the upper wall of the baffle assembly. At this gas rate, the system was stable at all liquid flow rates up to about 60 gallons per minute. Thus, by utilizing a notched weir it is possible to obtain a zero hydraulic gradient over a wide range of liquid flow rates.

Figure 6:
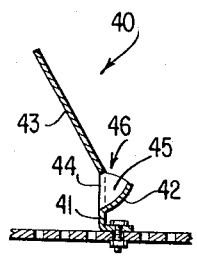
FIGS. 6 to 10 are vertical, cross-sectional views through modified baffle assemblies.

For high liquid flow rates, the baffle assembly 40 preferably includes (as shown in FIG. 6) a lower L-shaped flange 41, a lower wall 42 attached to the upper end of the L-shaped flange, and an upper wall 43 having legs 44 extending from its lower edge and attaching it to flange 41. Webs 45 extend from the sides of the legs to the adjacent sides of lower wall 42. As with baffle assembly 21, preferably this baffle assembly is pressed from a single sheet of metal. Lower wall 42 preferably is curved, the center of curvature being the lower edge of wall 43. By this arrangement, the size of the horizontal orifice 46 between the adjacent edges of the two walls determines the restriction to the flow of fluid between the upper surface of the lower wall 42 and the lower edge of upper wall 43. That is, the upper surface of lower wall 42 is always spaced from the lower edge of upper wall 43 a distance at least equal to the width of the horizontal orifice, and no further substantial restriction is presented to the flow of fluid between the lower wall 42 and the upper wall 43 than is presented by the horizontal orifice. For high liquid flow rates, the kinetic energy of the liquid flowing through the horizontal orifice and deflected in a substantially horizontal downstream direction by lower wall 42 would, if ejected from the lower wall adjacent the perforated tray, tend to displace the flow of vapor through the adjacent downstream perforations to the downstream side of each perforation, and liquid would tend to weep through the upstream side of these perforations at low vapor rates. By using an L-shaped flange 41 which spaces lower wall 42 a substantial distance above the perforated tray, liquid and vapor are caused to issue from the baffle assembly a substantial distance above the perforated tray, thereby minimizing and effectively preventing weeping at high liquid flow rates. Accordingly, this baffle assembly is preferred for high liquid flow rates.

Figure 7:
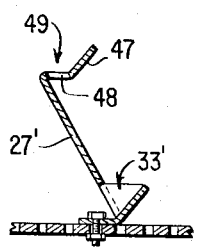

Should a large variation in flow rates be expected in the fractionating tower, causing the foam height to vary substantially and possibly well above the upper edge of upper wall 27 shown in FIG. 4, the baffle assembly may be modified to include a top wall 47 above upper wall 27', as shown in FIG. 7. Top wall 47 is attached to and spaced from upper wall 27' by legs 48, similar to legs 28 of the upper wall. The lower edge of top wall 47 preferably is as high as, or slightly higher than, the upper edge of wall 27', to provide a second horizontal orifice 49. Preferably top wall 47 is angled in an upstream direction. When the level of liquid and foam rises above upper wall 27', foam downstream of upper wall 27' will tend to spill over the top edge of wall 27' through orifice 49 and be drawn down through orifice 33' with the liquid flowing from upstream of the baffle assembly down through the orifice. Thus, back-mixing of the liquids is minimized. However, normally it is preferred to provide an upper wall 27 of sufficient height so that, at most, only small amounts of foam downstream of the upper wall will spill back over the upper edge of the wall.

Figure 8:
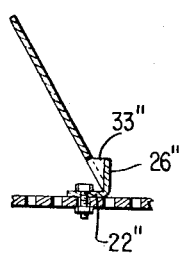

The lower wall of the baffle assembly may be vertical, as indicated by the baffle assembly shown in FIG. 8. For this construction of the baffle assembly, the foam flowing downwardly through the horizontal orifice 33" will be directed outwardly, mainly by flange 22", lower wall 26" merely providing the horizontal orifice.

Figure 9:
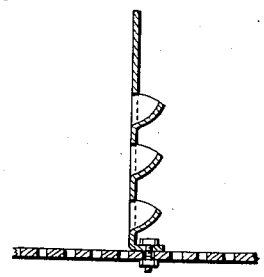
Figure 10:
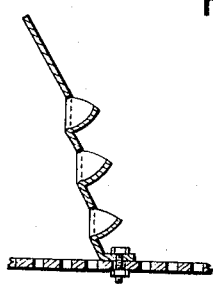

Since a substantially vertical upper wall would impart little if any force to the foam tending to push it downstream, should it be desired to use a substantially vertical upper wall, a plurality of horizontal orifices may be employed to increase the downstream force imparted to the foam, as indicated by the baffle assembly shown in FIG. 9. A plurality of horizontal orifices staggered in a vertical direction also may be provided when the upper walls are tilted in a down-stream direction, as illustrated in FIG. 10.

Rather than providing a baffle assembly having long, narrow, rectangular orifices such as are illustrated in FIG. 3, the baffle assembly may be formed with a number of short orifices as illustrated in FIG. 11 to provide a baffle assembly similar in appearance to a food greater. Such baffle assemblies may include horizontal orifices quite close to the lower edge of the baffle assembly and thus quite close to the perforated tray, when a minimum liquid level on the perforated tray is desired, such as in cryogenic columns.

While the baffle assembly has been described with respect to a fractionating tower, it should be understood that it may be incorporated with other structures, such as a unit having a fluidized or aerated bed of solid particles, to control the flow of aerated fluids, particularly where a downstream pressure equal to or greater than the upstream pressure adjacent the baffle assembly is desired.

It is to be understood that various changes may be made in the details of the baffle assemblies herein described without departing from the invention, the scope of the invention being set forth in the appended claims.

I claim:
1. For use in vertical fractionating tower having a plurality of perforated, superposed, spaced horizontal trays each arranged to receive a descending flow of liquid at one side thereof and to carry said liquid horizontally across said perforated tray to an outlet weir at the other side thereof while subjecting said liquid to a vapor stream ascending through the perforations in said trays, a generally vertically-extending baffle assembly providing a substantially horizontal orifice for controlling the flow of liquid across said trays comprising at least two wall elements extending generally in the same lateral direction and spaced both horizontally and vertically apart, the upper edge of the lower wall element defining the upstream edge of the horizontal orifice, the lower wall element extending only down from the horizontal orifice, the lower wall element being impervious and adapted to be attached to said tray in a fluid-tight manner, the lower edge of the upper wall element defining the downstream edge of the horizontal orifice, the upper wall element extending only up from the horizontal orifice, and the lower wall element extending under and across the vertical zone defined by the horizontal orifice.

2. A baffle assembly as set forth in claim 1 in which the lower wall element is spaced from the lower edge of the upper wall element a distance at least equal to the width of the horizontal orifice.

3. A baffle assembly as set forth in claim 2 in which the upper wall element is adapted to extend a substantial distance above the top edge of the outlet weir, and in which said horizontal orifice defined by the adjacent edges of the said two wall elements is adapted to lie at a level no higher than the top edge of said weir.

4. A baffle assembly as set forth in claim 3 in which said top wall element is tilted in a downstream direction.

5. In a liquid-vapor contact system including a uniformly perforated horizontal tray across which liquid may flow and through the perforations of which vapor may issue to produce a liquid-vapor foam, an outlet weir at the downstream end of said tray, said outlet weir extending vertically above the level of said tray and attached to the tray in a fluid-tight manner thereby to dam the flow of liquid across the tray and produce a pool of the liquid-vapor foam on the tray, the improvement comprising a lower wall extending laterally across the liquid flow, means to attach the lower wall in a fluid-tight manner on the perforated area of said tray, the upper edge of said outlet weir being at least as high as the upper edge of said lower wall, an upper wall extending laterally across the liquid flow, means attaching said upper wall to said lower wall over the perforated tray downstream and above the lower wall with the lower edge of said upper wall in substantially the same horizontal plane as the upper edge of said lower wall to provide a generally horizontal orifice between said adjacent edges which extends laterally across the liquid flow and through which said liquid-vapor foam may cascade, the height of said lower wall being at least as great as the width of said horizontal orifice as determined by the spacing between said adjacent edges, said lower wall extending under and across the vertical zone defined by the horizontal orifice, said lower wall element being spaced from the lower edge of the upper wall element a distance at least equal to the width of the horizontal orifice, said lower and upper walls comprising a baffle assembly.

6. A liquid-vapor contact system as set forth in claim 5 in which a plurality of said baffle assemblies are mounted on said perforated area of the tray intermediate the margins of the perforated area of the tray and spaced from one another.

7. A liquid-vapor contact system as set forth in claim 5 in which at least one of said wall elements of the baffle assembly is tilted from the vertical by transverse horizontal displacement of that one of its horizontal edges not defining the horizontal orifice in a downstream direction.

8. A liquid-vapor contact system comprising a perforated horizontal tray for receiving a flow of liquid thereacross and a flow of vapor through the perforations therein, the vapor agitating the liquid and producing a liquid-vapor foam over the perforated tray, and a generally vertically-extending baffle assembly providing a substantially horizontal orifice, said baffle assembly comprising at least two wall elements extending laterally across the flow of liquid and spaced both horizontally and vertically apart, the upper edge of the lower wall element defining the upstream edge of the horizontal orifice, the lower wall element extending only down from the horizontal orifice, the lower edge of the upper wall element defining the downstream edge of the horizontal orifice, the upper wall element extending only up from the horizontal orifice, the lower wall element extending under and across the vertical zone defined by said horizontal orifice, and means for preventing the flow of liquid in an upstream direction under the horizontal orifice of the baffle assembly.

9. A liquid-vapor contact system as set forth in claim 8 in which the lower wall element is spaced from the lower edge of the upper wall element a distance at least equal to the width of the horizontal or orifice as defined by the adjacent edges of said wall element.

10. A liquid-vapor contact system as set forth in claim 9 in which said means for preventing the flow of liquid in an upstream direction under said horizontal orifice includes a flange attached to the lower edge portion of said lower wall element, said flange including a horizontal extending portion, and means to attach the horizontally extending portion of said flange to the perforated tray in a fluid-tight manner.

11. A liquid-vapor contact system as set forth in claim 10 in which the upper wall element is tilted in a downstream direction.

12. A liquid-vapor contact system as set forth in claim 8 including an outlet weir at the downstream end of said perforated tray, said outlet weir extending vertically above the level of said tray and attached to the tray in a fluid-tight manner thereby to dam the flow of liquid across the tray and produce a pool of liquid-vapor foam on the tray.

13. A liquid-vapor contact system as set forth in claim 12 in which the outlet weir is notched.

14. A liquid-vapor contact system as set forth in claim 13 in which the upper portion of the outlet weir is notched.

References Cited

UNITED STATES PATENTS

| | | | |
|---|---|---|---|
| 180,901 | 8/1876 | Maynard | 261—114 |
| 243,297 | 6/1881 | Perin | 261—114 |
| 1,893,906 | 1/1933 | Primrose et al. | 261—114 XR |
| 2,401,569 | 6/1946 | Koch | 261—114 |
| 2,510,590 | 6/1950 | Kraft | 261—114 |
| 2,693,350 | 11/1954 | Ragatz | 202—158 XR |
| 2,702,434 | 2/1955 | Richardson et al. | |
| 2,757,915 | 8/1956 | Huggins | 261—114 |
| 2,832,578 | 4/1958 | Gilmore | 261—114 |
| 2,926,754 | 3/1960 | Ragatz | 261—114 XR |

HARRY B. THORNTON, *Primary Examiner.*

RONALD R. WEAVER, *Examiner.*

E. H. RENNER, *Assistant Examiner.*

UNITED STATES PATENT OFFICE
CERTIFICATE OF CORRECTION

Patent No. 3,362,696                     January 9, 1968

James L. Vaughan

It is hereby certified that error appears in the above numbered patent requiring correction and that the said Letters Patent should read as corrected below.

Column 2, line 59, for "contral" read -- control --; column 3, line 65, after "plate" insert -- 3 --; column 7, line 64, for "in" read -- to --; line 69, for "quality" read -- quantity --; column 12, line 28, strike out "or".

Signed and sealed this 29th day of April 1969.

(SEAL)
Attest:

Edward M. Fletcher, Jr.                        EDWARD J. BRENNER
Attesting Officer                              Commissioner of Patents